(12) United States Patent
Cho

(10) Patent No.: US 11,548,502 B2
(45) Date of Patent: Jan. 10, 2023

(54) SYSTEM, METHOD, INFRASTRUCTURE, AND VEHICLE FOR AUTOMATED VALET PARKING

(71) Applicants: Hyundai Motor Company, Seoul (KR); Kia Motors Corporation, Seoul (KR)

(72) Inventor: Hoon Kyung Cho, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 192 days.

(21) Appl. No.: 16/728,702

(22) Filed: Dec. 27, 2019

(65) Prior Publication Data

US 2020/0207338 A1 Jul. 2, 2020

(30) Foreign Application Priority Data

Dec. 28, 2018 (KR) ........................ 10-2018-0172365

(51) Int. Cl.
*B60W 30/09* (2012.01)
*B60W 30/06* (2006.01)
*G01C 21/32* (2006.01)
*G05D 1/02* (2020.01)

(52) U.S. Cl.
CPC ............ *B60W 30/09* (2013.01); *B60W 30/06* (2013.01); *G01C 21/32* (2013.01); *G05D 1/0214* (2013.01); *G05D 1/0276* (2013.01); *B60W 2554/20* (2020.02); *B60W 2556/45* (2020.02); *B60W 2710/18* (2013.01); *G05D 2201/0213* (2013.01)

(58) Field of Classification Search
CPC .............. G01C 21/32; B60W 2554/20; B60W 2556/45; B60W 2710/18; G05D 2201/0213
See application file for complete search history.

(56) References Cited

U.S. PATENT DOCUMENTS

| | | | |
|---|---|---|---|
| 10,338,586 B2* | 7/2019 | Kurt | G01C 21/3407 |
| 10,558,224 B1* | 2/2020 | Lin | G08G 1/165 |
| 10,878,701 B2* | 12/2020 | Damsaz | G08G 1/015 |
| 2010/0156672 A1 | 6/2010 | Yoo et al. | |
| 2017/0076508 A1* | 3/2017 | VanBlon | G06T 19/00 |
| 2017/0351267 A1 | 12/2017 | Mielenz | |
| 2018/0136644 A1* | 5/2018 | Levinson | H04L 41/0816 |
| 2018/0229719 A1* | 8/2018 | Izumi | B62D 15/0285 |
| 2018/0321685 A1 | 11/2018 | Yalla et al. | |
| 2019/0077460 A1* | 3/2019 | Nordbruch | G05D 1/0214 |
| 2020/0090352 A1* | 3/2020 | Murashkin | G06T 7/521 |

(Continued)

FOREIGN PATENT DOCUMENTS

| | | |
|---|---|---|
| DE | 102016223094 A1 | 5/2018 |
| EP | 3333049 A1 | 6/2018 |
| KR | 101655290 B1 * | 9/2016 |

*Primary Examiner* — Jeff A Burke
*Assistant Examiner* — Jerrod Irvin Davis
(74) *Attorney, Agent, or Firm* — Slater Matsil, LLP

(57) ABSTRACT

The present invention relates to a system, method, infrastructure, and vehicle for performing automated valet parking. The present disclosure enables an unmanned vehicle to autonomously move to and park at an empty parking space by communicating with a parking infrastructure. The present disclosure enables an unmanned vehicle to autonomously move from a parking space to a pickup zone by communicating with a parking infrastructure.

19 Claims, 12 Drawing Sheets

(56) References Cited

U.S. PATENT DOCUMENTS

| | | | |
|---|---|---|---|
| 2021/0018916 A1* | 1/2021 | Thakur | G05D 1/0088 |
| 2021/0171020 A1* | 6/2021 | Sugano | B60W 30/06 |
| 2021/0173400 A1* | 6/2021 | Hasegawa | G08G 1/0145 |
| 2021/0181743 A1* | 6/2021 | Eshima | G08G 1/143 |
| 2021/0221358 A1* | 7/2021 | Wang | G08G 1/168 |
| 2021/0253128 A1* | 8/2021 | Nister | B60W 50/0097 |
| 2021/0253131 A1* | 8/2021 | Sen | B60W 60/0027 |

* cited by examiner

| Step | Infra | Vehicle |
|---|---|---|
| <1> AVPS START | • Recognize and qualify an appropriate user (by user ID and PW) and vehicle (by unique number assigned to vehicle)<br>• Manage driving authority (receiving driving authority from the user/return the driving authority to the user)<br>• Transmit automated driving start instruction to vehicle | • Perform engine ON/OFF or power ON/OFF according to the instruction of infra<br>• Lock the vehicle according to the instruction of infra<br>• Determine human or animal inside the vehicle |
| <2> DETERMINATION OF TARGET POSITION AND GUIDE ROUTE | • Determine the target position, guide route, and permissive driving area, and deliver those information to vehicle | |
| <3> AUTONOMOUS DRIVING | • Instruct automated driving (start, stop, re-start) to vehicle | • Drive along the guide route designated by infra within the permitted driving area at a speed of 10km/h or less<br>• Drive within the path and width designated by infra without deviation<br>• Drive along a curve with the minimum inner radius of the vent designated by the infra without deviation<br>• Drive on a path with the gradient less than or equal to the maximum gradient designated by infra |
| <4> POSITION MEASUREMENT (vehicle, obstacle) | • Be aware of and manage vehicle location<br>• Detect and recognize vehicles and obstacles (TBD), and monitor safety driving and parking operation of each vehicle (supervise) | • Estimate its own position<br>• Inform the infra of its estimated position / with the accuracy and frequency specified below (TBD)<br>• Inform the infra of its own status<br>• Detect the following obstacles (TBD) |
| <5> AUTONOMOUS PARKING | | • Park and Stop the vehicle at the target position designated by infra (equivalent to PAPS parking requirements) |

Fig. 4A

| Step | Infra | Vehicle |
|---|---|---|
| <6> EMERGENCY BRAKE | • Continue to instruct automated driving to vehicle when safety is ensured as a result of safety confirmation, and to instruct the vehicle to perform an emergency stop, if safety is not confirmed | • Start/emergency stop/re-start automated driving according to the instruction of infra<br>• Perform an emergency stop in case where a potential hazard is determined as a result of the detection mentioned above<br>• Immediately decelerate at the rate of (TBD) m/s2 and stop, when the following conditions are met<br>  (1) vehicle received an instruction from infra for E/S<br>  (2) vehicle detected an obstacle (TBD)<br>• After coming to a stop, the vehicle shall remain stopped until it receives an instruction from infra to resume automated driving<br>• Vehicle shall re-start suspended driving or parking when it receives an instruction to start automated driving from the infra after confirming that there is no obstacle ahead in the path |
| <7> AVPS END | • After the vehicle completes automated driving and parking, the infra transmits Vehicle control release instruction to the vehicle | • Perform engine ON/OFF or power ON/OFF according to the instruction of infra<br>• Lock the vehicle according to the instruction of infra<br>• Mechanically fix or restrain wheels using such as the parking brake |
| <8> FAULT CONTROL (communication or vehicle fault) | • Detect communication faults between the infra and vehicle | • Detect faults in communication with infra during driving<br>• Detect vehicle's faults (e.g. part failure, human or animal remaining inside the vehicle, etc.)<br>• Perform emergency stop when above fault is detected<br>• After coming to a stop, the vehicle shall remain stopped until it receives an instruction from infra to resume automated driving |

Fig. 4B

| DATA | Contents | Transmit (T)/ Receive (R) | | Regularity(F)/ Event(E) Transmission | Note |
|---|---|---|---|---|---|
| | | Infrastructure | Vehicle | | |
| (1) Vehicle qualification information | ID number (VIN) to identify each vehicle | R | T | E when entering the parking | |
| (2) Automated driving preparation instruction | - | T | R | E Right before automated driving start | |
| (3) Vehicle information notification | Vehicle state (normal stop/driving /emergency stop, etc), Vehicle position | R | T | F (1 Hz) | This is also used for communication fault check by the vehicle |
| (4) Vehicle information response | - | T | R | F (1 Hz) | |

Fig. 5A

| DATA | Contents | Transmit (T)/ Receive (R) | | Regularly(F)/ Event(E) Transmission | Note |
|---|---|---|---|---|---|
| | | Infrastructure | Vehicle | | |
| (5) Target position, guide route Delivery | Target position, Passing point location/Permitted time to pass through the point Maximum speed | T | R | E After automated driving instruction | |
| (6) Driving boundaries delivery | A group of lines to surround the permitted driving area | T | R | E After automated driving preparation instruction | |
| (7) Automated driving start instruction | — | T | R | E After delivery of guide route and driving boundaries, when restarting after emergency stop | |
| (8) Emergency stop instruction | — | T | R | | |
| (9) Vehicle control release instruction | — | T | R | | |

Fig. 5B

SYSTEM, METHOD, INFRASTRUCTURE, AND VEHICLE FOR AUTOMATED VALET PARKING

CROSS-REFERENCE TO RELATED APPLICATIONS

This application claims priority to Korean Patent Application No. 10-2018-0172365, filed on Dec. 28, 2018, which application is hereby incorporated herein by reference.

TECHNICAL FIELD

The present invention relates to a system, method, infrastructure, and vehicle for performing automated valet parking. The present disclosure enables an unmanned vehicle to autonomously move to and park at an empty parking space by communicating with a parking infrastructure. The present disclosure enables an unmanned vehicle to autonomously move from a parking space to a pickup zone by communicating with a parking infrastructure.

BACKGROUND

Many modern cities suffer from various parking-related issues. For example, there is a high risk of a car collision in a parking lot. For parking in crowded places such as large shopping centers, it takes long time and much energy to park a vehicle due to traffic congestion before entering a parking lot. In addition, it takes long time and much energy to locate an empty parking space even after entering a parking lot. In addition, there is inconvenience that a driver has to move to a spot at which his or her vehicle is parked at the time of leaving the visited area or that a driver often has difficulty in retrieving his or her vehicle without remembering the place where his or her vehicle is parked.

SUMMARY

The present disclosure has been made in view of the problems occurring in the related art and an objective of the present disclosure is to enable an automated valet parking service by which a driver can leave his or her vehicle at a predetermined drop-off zone and the vehicle without the driver seated autonomously moves to and parks at an empty parking space within a parking lot.

Another objective of the present disclosure is to enable an automated valet parking service by which a vehicle that has been parked autonomously moves from a parking space to a predetermined pickup zone so that the driver can conveniently leave the parking lot.

According to embodiments of the present disclosure, an apparatus for automated valet parking includes a processor and a transceiver, in which the processor determines a first target position and a first guide route using a map stored in the apparatus and detects an obstacle on the basis of sensor data, an infrastructure updates the map by reflecting the obstacle on the map, and the transceiver transmits the first target position and the first guide route to a first vehicle under control of the processor.

According to embodiments of the present disclosure, an automated valet parking method includes: determining, by an infrastructure, a first target position and a first guide route using a map stored in the infrastructure; transmitting, by the infrastructure, the first target position and the first guide route to a first vehicle; detecting, by the infrastructure, an obstacle on the basis of sensor data transmitted from the first vehicle; determining, by the infrastructure, a second target position and a second guide route on the basis of the detected obstacle; and transmitting, by the infrastructure, the second target position and the second guide route to a second vehicle.

A program containing instructions for executing the automated valet parking method according to embodiments of the present disclosure is stored in a computer-readable non-transitory recording medium.

BRIEF DESCRIPTION OF THE DRAWINGS

The above and other objects, features and other advantages of the present invention will be more clearly understood from the following detailed description taken in conjunction with the accompanying drawings, in which:

FIGS. 4A and 4B are diagrams illustrating operations performed by a parking infrastructure and a vehicle for automated valet parking, according to one embodiment of the present disclosure;

FIG. 5, which includes FIGS. 5A and 5B, is a diagram illustrating a communication process performed by a vehicle and a parking infrastructure for automated valet parking according to one embodiment of the present disclosure;

DETAILED DESCRIPTION OF ILLUSTRATIVE EMBODIMENTS

Figure 1:
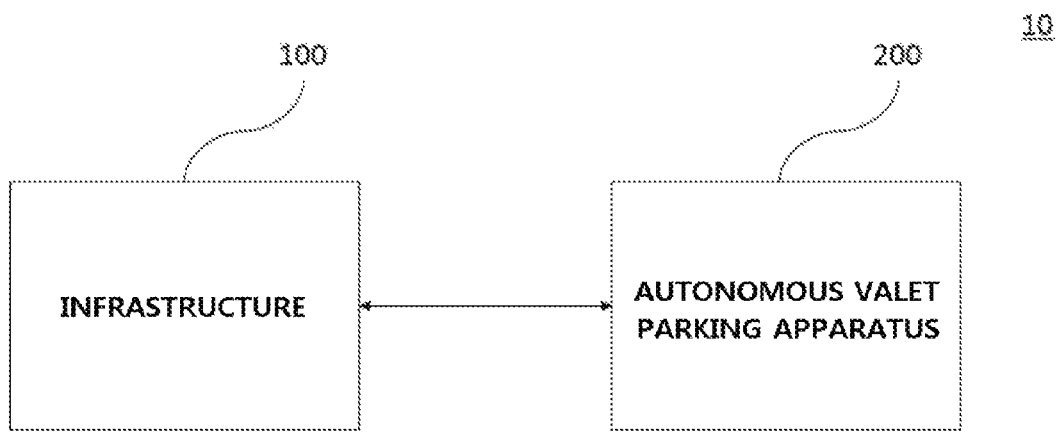
FIG. 1 is a diagram illustrating an automated valet parking system according to one embodiment of the present disclosure.

Herein below, exemplary embodiments of the present disclosure will be described in detail with reference to the accompanying drawings. The construction and operational effect of the present disclosure will be clearly understood from the following detailed description. Prior to describing exemplary embodiments of the present disclosure in detail, it is noted that throughout the drawings the same components will be denoted by the same reference numerals as possible and a detailed description about existing components and functions is omitted when the subject matter of the present disclosure may be obscured by the description.

It is also noted that terms used in the detailed description of the present disclosure are defined below.

The term "driver" refers to a person who uses an automated valet parking service provided by an automated valet parking system.

The term "driving authority" refers to the authority to perform vehicle operations. The term "vehicle operation" refers to an operation such as steering, accelerating, braking, gear shifting, vehicle starting, and door locking and unlocking of a vehicle.

The term "vehicle" refers to a vehicle having an autonomous valet parking feature.

The term "control center" refers to a facility that can monitor vehicles parked in a parking garage or facility, which determines a target position, a guide route, and a permitted driving area, and which transmits a driving start command or an emergency stop command to a vehicle.

The term "infrastructure" refers to a parking facility or sensors installed in the parking facility. Alternatively, in some cases, the term "infrastructure" may refer to a control center that controls a parking lot gate, vehicles in a parking lot, etc.

The term "target position" refers to an empty space available for parking. Alternatively, in a case where drivers leave a parking lot, the term "target position" may refer to a pickup zone where the drivers get in their vehicles.

The term "guide route" refers to a route along which a vehicle drives to reach a target position. For example, in a case of performing parking, the guide route refers to a route along or according to which a vehicle needs to navigate from a drop-off zone to an empty space. For example, the guide route is provided in the form of instructions, for example, "driving forward a distance of 50 m and turning left at the corner".

The term "driving route" refers to a driving path along which a vehicle drives.

The term "permitted driving area" refers to an area where a vehicle can drive in a parking lot. For example, the permitted driving area includes the driving route. The permitted driving area is defined with barrier walls, parked vehicles, parking lines, etc.

FIG. 1 is a diagram illustrating an automated valet parking system according to one embodiment of the present disclosure. Referring to FIG. 1, an automated valet parking system 10 includes a parking infrastructure 100 and an autonomous valet parking apparatus 50.

The infrastructure 100 refers to an apparatus, facility or system for operating, managing, and controlling an automated valet parking system. For example, the infrastructure 100 may be a parking facility. According to embodiments, the infrastructure 100 includes sensors, communication devices, alarm devices, display devices, and a server that controls those devices and sensors. Alternatively, in some cases, the term "infrastructure" may refer to a control center that controls a parking lot gate, vehicles in a parking lot, etc.

The infrastructure 100 includes a transceiver for performing communication and a processor for performing computation. According to embodiments, the infrastructure 100 may further include sensors for detecting nearby objects and surrounding parameters. In the present disclosure, determinations and computations performed by the infrastructure 100 are performed by the processor.

The autonomous valet parking apparatus 50 refers to a vehicle that can perform autonomous valet parking. According to embodiments, the autonomous valet parking apparatus 50 refers to a component or a set of components capable of performing autonomous valet parking.

Figure 2:
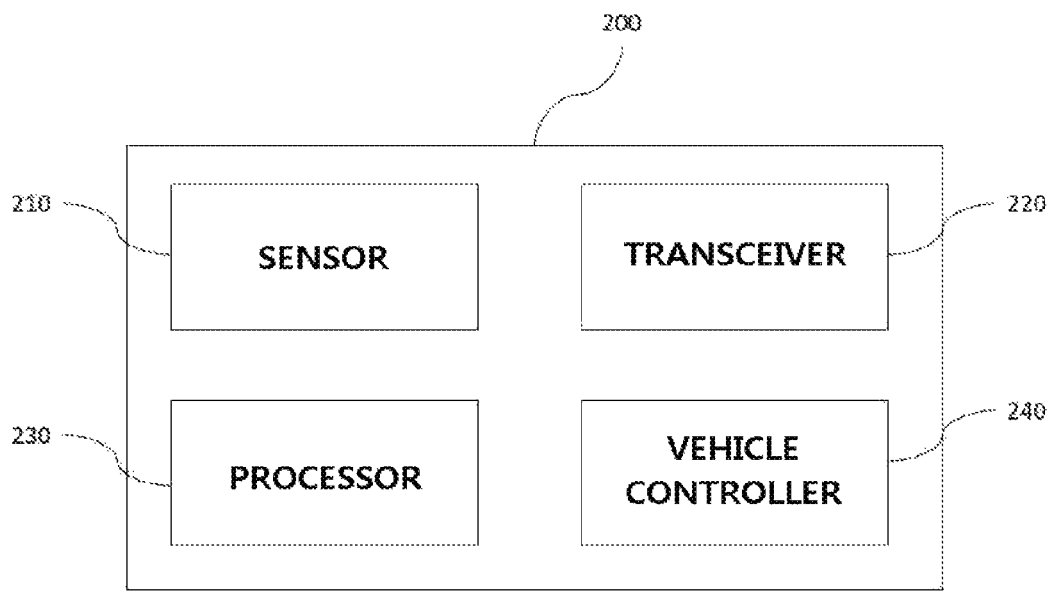
FIG. 2 is a diagram illustrating an autonomous valet parking apparatus according to one embodiment of the present disclosure.

FIG. 2 is a diagram illustrating an autonomous valet parking apparatus according to one embodiment of the present disclosure. Referring to FIG. 2, the autonomous valet parking apparatus (for example, vehicle 200) includes a sensor 210, a transceiver 220, a processor 230, and a vehicle controller 240.

The sensor 210 monitors the surroundings of the autonomous valet parking apparatus 50. According to embodiments, the sensor 210 measures the distance between the autonomous valet parking apparatus 50 and a specific object or detects a nearby object. For example, the sensor 210 includes at least one of the sensors selected from among an ultrasonic sensor, a RADAR sensor, a LIDAR sensor, a camera, an infrared sensor, a thermal sensor, and a millimeter wave sensor.

The sensor 210 transmits data resulting from sensing or measurements to the transceiver 220 or to the vehicle controller 240.

The transceiver 220 exchanges data with the infrastructure 100. This communication is called vehicle-to-infra V2I) communication. This communication is called "vehicle to infra (V2I)" communication. The transceiver 220 communicates the data with other vehicles. This communication is called vehicle-to-vehicle (V2V) communication. The V2I communication and the V2V communication are collectively called vehicle-to-everything (V2X) communication. According to embodiments, the transceiver 220 receives data such as a target position, a guide rote, a navigation route, a command, etc. from the infrastructure 100, processes the received data, and transmits the resulting data to the processor 230. The transceiver 220 transmits data collected and generated by the vehicle 200 to the infrastructure 100. According to embodiments, the transceiver 220 exchanges data with a terminal device of the driver of the vehicle 200.

The transceiver 220 receives and transmits data by using a wireless communication protocol or a cable communication protocol. Examples of the wireless communication protocol include, not limitedly, wireless LAN (WLAN), digital living network alliance (DLNA), wireless broadband (Wibro), world interoperability for microwave access (Wimax), global system for mobile communication (GSM), code division multi access (CDMA), code division multi access 2000 (CDMA2000), enhanced voice-data optimized or enhanced voice-data only (EV-DO), wideband CDMA (WCDMA), high speed downlink packet access (HSPDA), high speed uplink packet access (HSUPA), IEEE802.16, long term evolution (LTE), long term evolution-advanced (LTE-A), wireless mobile broadband service (WMBS), Bluetooth, infrared data association (IrDA), ultra-wideband (UWB), ZigBee, near field communication (NFC), ultra sound communication (USC), visible light communication (VLC), Wi-Fi, and Wi-Fi direct. Examples of the cable communication protocol include, but are not limited to, wired local area network (LAN), wired wide area network (WAN), power line communication (PLC), USB communication, Ethernet communication, serial communication, and optical/coaxial cable communication. Other protocols that support communication between devices fall within the definition of the communication protocol that is used in the present invention.

The processor 230 controls the overall operation of the vehicle 200. The processor 230 controls the vehicle controller 240 on the basis of the data transmitted from the sensor 210 and the transceiver 220. According to embodiments, the processor 230 generates a control signal for adaptively controlling the vehicle controller 240 according to the data transmitted from the infrastructure boo and transmits the control signal to the vehicle controller 240.

That is, the processor 230 refers to a device that performs a series of computations or makes a series of determinations to control the vehicle 200 for the purpose of autonomous valet parking. For example, the processor 230 may be a processor capable of executing a software program including instructions for performing automated valet parking.

Examples of the processor 230 include a central processing unit (CPU), a micro controller unit (MCU), an application specific integrated circuit (ASIC), a field programmable gate array (FPGA), and a graphic processing unit (GPU) but are not necessarily limited thereto.

The vehicle controller 240 controls the operation of the vehicle 200 according to the control signal issued by the processor 230. According to embodiments, the vehicle controller 240 controls the vehicle 200 in response to the control signal transmitted from the processor 230. For example, the vehicle controller 240 controls various vehicle operations such as driving, stopping, resuming of driving, steering, accelerating, decelerating, parking, lamp lighting, alarm sounding, etc.

That is, it will be appreciated that the vehicle controller 240 can perform all the functions for controlling the operations of the vehicle 200. That is, the vehicle controller 240 may include a driving unit, a braking unit, a steering unit, an acceleration unit, an alarm unit, and a lighting unit.

On the other hand, although not described herein, the operations and/or functions of the vehicle 200 described in the description herein are performed by the conjunction of one or more components selected from among the sensor 210, the transceiver 220, the processor 230, and the vehicle controller 240.

Figure 3:
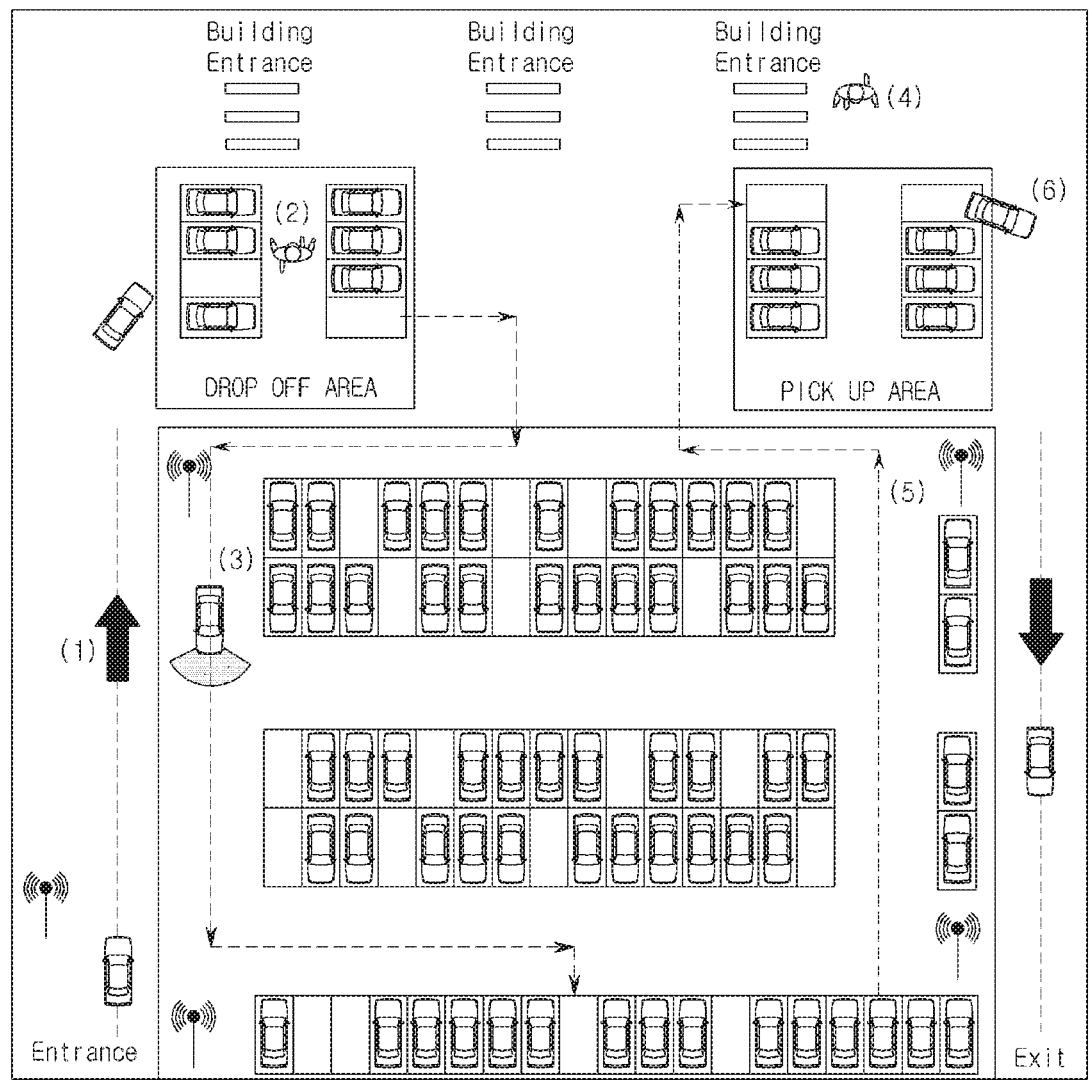
FIG. 3 is a conceptual diagram illustrating an automated valet parking system and method according to one embodiment of the present disclosure.

FIG. 3 is a conceptual diagram illustrating an automated valet parking system and method according to one embodiment of the present disclosure.

Referring to FIG. 3, in step (1), a driver drives a vehicle to a drop-off zone in a parking lot.

In step (2), the driver leaves the vehicle at the drop-off zone and the authority to drive or control the vehicle is delegated to the infrastructure.

In step (3), the infrastructure searches for empty parking slots among all the parking slots in the parking lot and assigns a suitable empty parking slot among the empty parking slots to the vehicle. The infrastructure determines a guide route which guides the vehicle to the assigned empty parking slot. After the parking slot and the guide route are determined, the vehicle autonomously drives along the guide route to reach the assigned parking slot and performs autonomous parking at the parking slot.

In step (4), the driver moves to a pickup zone where the vehicle will pick up the driver when the driver wants to leave the parking lot.

In step (5), the infrastructure determines a suitable target position. For example, the suitable target position may be an empty parking slot of multiple parking slots within the pickup zone. The infrastructure determines a guide route which leads the vehicle to the target position. After the target position and the guide route are determined and transmitted to the vehicle, the vehicle autonomously drives along the guide route to reach the target position and performs autonomous parking.

In step (6), the driver arrives at the pickup zone and takes over the authority to drive the vehicle. The driver drives the vehicle toward the exit of the parking lot.

FIGS. 4A and 4B are diagrams illustrating operations performed by a parking infrastructure and a vehicle for automated valet parking, according to one embodiment of the present disclosure.

In step (1), operations of the infrastructure and the vehicle to start automated valet parking are performed. The infrastructure identifies the driver and the vehicle and determines whether the driver and the vehicle are qualified. For example, the infrastructure determines whether the driver is a qualified driver by reading an identification number (ID) or a password input by the driver. In addition, the infrastructure determines whether the vehicle is a qualified vehicle by reading to a vehicle identification number of the vehicle. The vehicle can turn on and off the engine by itself. The vehicle can turn on and off the power supply by itself. For example, a state in which the engine of the vehicle is turned off and the power supply is turned on is referred to as an accessory-on (ACC-On) state. The engine on/off and the power supply on/off of the vehicle are performed according to instructions transmitted from the infrastructure or automatically performed without depending on the instructions transmitted from the infrastructure. The vehicle can lock and unlock the doors by itself. The locking/unlocking of the vehicle doors is performed according to instructions transmitted from the infrastructure or is automatically performed without depending on the instructions from the infrastructure. When the vehicle proceeds to an autonomous parking step, it is preferable to lock the vehicle doors. In addition, the driving authority of the vehicle is delegated to the infrastructure from the vehicle. The driving authority means an authority to control vehicle operations. The vehicle operations include steering, accelerating, braking, gear shifting, ignition turning, and door locking and unlocking. Since the driving authority of the vehicle is delegated to the infrastructure, the infrastructure takes complete control of the vehicle during the automated valet parking of the vehicle. Accordingly, the likelihood that an unintended operation of the vehicle occurs is lowered and vehicle accidents in the parking lot are prevented. However, in some cases, the driving authority may be partially delegated to the infrastructure so that the vehicle can still control some of the vehicle operations, or the driving authority may be shared by the vehicle and the infrastructure. For example, a braking operation may be performed when an emergency occurs during the autonomous valet parking procedure. Therefore, it is preferable for the vehicle to apply a brake without intervention of the infrastructure when the vehicle senses a danger with help of an ADAS sensor. In addition, the vehicle checks whether a person or animal is present in the vehicle. Since a parking duration from the completion of the autonomous valet parking to the discharging of the vehicle from a parking lot is long, if a person or animal is accidently left in the vehicle, the person or animal would be in danger. Therefore, it is important to ensure that the vehicle is empty before the vehicle is parked. Whether a person or animal is present in the vehicle may be checked with a sensor mounted on the vehicle.

In step (2), a process of determining a target position, a guide route, and a driving route is performed. The determination of the target position, the guide route, and the driving route is performed by the infrastructure. The target position, the guide route, and the driving route determined by the infrastructure are delivered from the infrastructure to the vehicle.

In step (3), an autonomous driving operation is performed in the parking lot. The autonomous driving of the vehicle includes driving, normal stopping, and resuming of driving. The autonomous driving of the vehicle is performed according to instructions transmitted from the infrastructure to the vehicle. Alternatively, the autonomous driving of the vehicle may be performed without relying on the instructions transmitted from the infrastructure. The vehicle can autonomously drive to the target position along the guide route within a permitted driving area. During the driverless autonomous driving of the vehicle, the vehicle is controlled to drive at a preset speed or below. This preset speed may be a value transmitted from the infrastructure to the vehicle or may be a value stored in the vehicle. In addition, the vehicle is controlled not to deviate beyond an error margin from the given guide route when driving along the guide route.

This preset error margin may be a value transmitted from the infrastructure to the vehicle or may be a value stored in the vehicle. In addition, the vehicle may turn with a predetermined minimum turning radius when it is necessary to turn during the autonomous driving along the guide route. This preset minimum turning radius may be a value transmitted from the infrastructure to the vehicle or may be a value stored in the vehicle. The vehicle is controlled not to exceed a predetermined maximum acceleration value when autonomously driving along the guide route. This preset maximum acceleration value may be a value transmitted from the infrastructure to the vehicle or may be a value stored in the vehicle.

In step (4), a position measurement operation is performed. The target of the position measurement may be a vehicle to be parked in a parking lot, an obstacle existing in the parking lot, or a vehicle that is parked in the parking lot. The infrastructure measures the position of the vehicle or the obstacle and stores the measured position in a database. The infrastructure identifies and detects vehicles or obstacles and monitors the safety of each of the plurality of vehicles in the parking lot. In addition, the infrastructure monitors the operating state of the vehicle that is performing autonomous parking after reaching the target position and transmits an instruction on the basis of the results of the monitoring. The vehicle measures its position. The vehicle transmits the measured position to the infrastructure. The error of the position measured by the vehicle needs to be within a predetermined error range. The predetermined error range is determined by the infrastructure. The vehicle detects obstacles present around the vehicle, measures the positions of the obstacles, and transmits the measured positions of the respective obstacles to the infrastructure. The communication between the vehicle and the infrastructure is performed at a predetermined frequency.

In step (5), an autonomous parking operation is performed by the vehicle. The autonomous parking refers to an operation in which the vehicle that has reached around the target position driverlessly goes into a target parking slot. The vehicle performs autonomous parking by sensing nearby obstacles or vehicles that are parked, with the help of a distance sensor mounted on the vehicle. Examples of the distance sensor mounted on the vehicle include an ultrasonic sensor, a RADAR sensor, a LIDAR sensor, and a camera.

In step (6), an emergency braking process is performed. The emergency braking of the vehicle is performed according to instructions transmitted from the infrastructure or may be performed on its own determination when the vehicle detects an obstacle. The infrastructure instructs the vehicle to apply an emergency brake when it is determined that an area around the vehicle is unsafe. When the infrastructure determines that the surroundings of the vehicle become safe after the emergency braking is performed, the infrastructure orders the vehicle to resume autonomous driving or autonomous parking. When the vehicle detects an obstacle, the vehicle applies an emergency brake on its own. In addition, the vehicle reports to the infrastructure the emergency braking that is performed by itself or the type or location of an obstacle which is the cause of the emergency braking. The vehicle reduces its speed according to a predetermined deceleration value preset for the emergency braking. This predetermined deceleration value is a value determined by the infrastructure or a value stored in the vehicle. The predetermined deceleration value may be determined according to the type of an obstacle, the position of an obstacle, and the distance between the vehicle and an obstacle. The vehicle resumes autonomous driving or autonomous parking upon receiving a resumption instruction for the autonomous driving or autonomous parking from the infrastructure. Alternatively, the vehicle resumes the autonomous driving or autonomous parking when it confirms that the obstacle is removed. The vehicle reports to the infrastructure of the resumption of autonomous driving or autonomous parking and of the removal of the obstacle.

In step (7), the automated valet parking procedure is finished. After the vehicle has completed autonomous driving and autonomous parking, the infrastructure issues a control release instruction to the vehicle. The vehicle can turn on and off the engine and turn on and off the power supply according to instructions received from the infrastructure or without depending on the instructions from the infrastructure. In addition, the vehicle can lock and unlock the vehicle doors according to instructions received from the infrastructure or without depending on the instructions from the infrastructure. Further, the vehicle can apply a parking brake according to instructions received from the infrastructure or without depending on the instructions from the infrastructure.

In step (8), an error control operation is performed. The error control is performed when an error occurs in communication between the vehicle and the infrastructure and/or when a mechanical error of the vehicle occurs. The infrastructure monitors communication between the infrastructure and the vehicle to detect whether a communication error occurs. The vehicle detects a communication error by monitoring the communication between the infrastructure and the vehicle. The vehicle detects whether a mechanical error occurs by monitoring operating states of built-in accessories including sensors mounted thereon. The vehicle detects the presence of a person or animal in the vehicle and applies an emergency brake when the presence of a person or animal is detected. The vehicle resumes autonomous parking or autonomous driving according to instructions received from the infrastructure when the vehicle is in an emergency stop state. Alternatively, the vehicle may determine, by itself, whether the cause of the emergency braking is removed and resumes autonomous parking or autonomous driving when the cause of the emergency parking is removed.

FIG. 5, which includes FIGS. 5A and 5B, is a diagram illustrating a communication process performed by a vehicle and a parking infrastructure for automated valet parking according to one embodiment of the present disclosure.

In step (1), vehicle qualification information is delivered from the vehicle to the infrastructure. The vehicle qualification information includes an identifier that distinguishes each vehicle from other vehicles. For example, the vehicle qualification information may be a unique vehicle number (for example, license plate number) of the vehicle. The vehicle qualification information is transmitted at a stage in which the vehicle enters a parking lot and the autonomous valet parking procedure is started (see (1) of FIG. 2A).

In step (2), an autonomous valet parking preparation instruction is transmitted from the infrastructure to the vehicle. The autonomous valet parking preparation instruction is transmitted before the autonomous driving of the vehicle begins.

In step (3), vehicle information is transmitted from the vehicle to the infrastructure. The vehicle information includes state information of the vehicle and position information of the vehicle. The state information of the vehicle includes whether the vehicle is driving, whether the vehicle is stopped, or whether the vehicle is in an emergency stop state. The vehicle information is transmitted periodically at a specific frequency (for example, 1 Hz which means once per second). The vehicle information is used as a parameter to determine whether a communication error has occurred between the vehicle and the infrastructure. For example, when the vehicle information does not reach the infrastructure at a specific time that is estimated according to the communication frequency, the infrastructure determines that an error has occurred in communication between the vehicle and the infrastructure.

In step (4), an acknowledgement of the reception of the vehicle information is transmitted from the infrastructure to the vehicle. The acknowledgement of the reception of the vehicle information is transmitted at the same frequency as the transmission of the vehicle information that is transmitted in step (3). Therefore, the acknowledgement of the reception of the vehicle information is used as a parameter to determine whether an error has occurred in communication between the vehicle and the infrastructure. For example, when the vehicle information does not reach the infrastructure at a specific time that is estimated according to the communication frequency, the infrastructure determines that an error has occurred in communication between the vehicle and the infrastructure.

In step (5), a target position and a guide route are delivered from the infrastructure to the vehicle. The delivery of the target position and the guide route may be performed either before or after an autonomous valet parking start instruction is transmitted from the infrastructure to the vehicle.

In step (6), driving area boundary information is transmitted to the vehicle from the infrastructure. The driving area boundary information includes landmarks (for examples, lines demarcating parking slots, a central line, and lane boundary lines demarcating a driving lane) that mark the boundaries of a permitted driving area. The transmission of the driving area boundary information is performed after the autonomous valet parking preparation instruction is delivered. This driving area boundary information is transmitted from the infrastructure to the vehicle in the form of a parking lot map.

In step (7), the autonomous valet parking start instruction is transmitted from the infrastructure to the vehicle. The transmission of the autonomous valet parking start instruction is performed after the guide route and the driving area boundary information are delivered. Alternatively, the autonomous valet parking start instruction is transmitted when the cause of the emergency braking is removed.

In step (8), an emergency braking instruction is transmitted to the vehicle from the infrastructure.

In step (9), a vehicle control release instruction is transmitted to the vehicle from the infrastructure. The delivery of the vehicle control release instruction is performed after the vehicle is autonomously parked at a parking slot.

Figure 6:
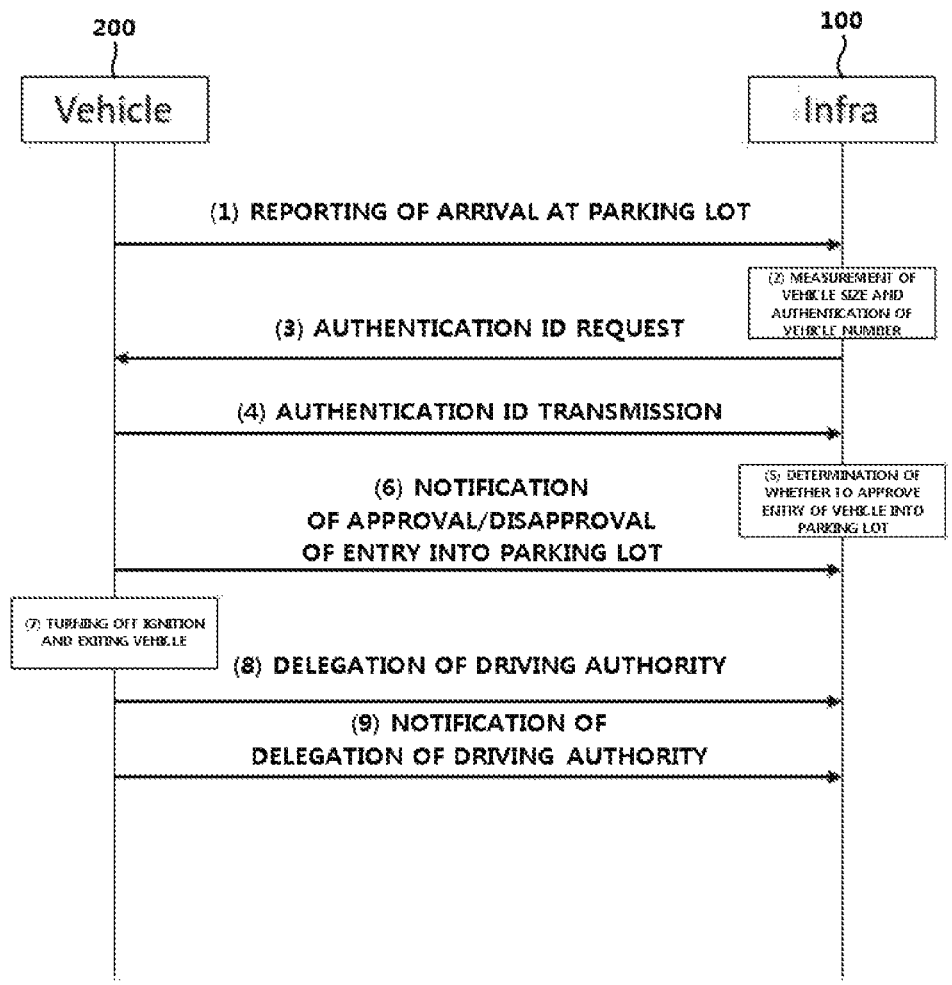
FIG. 6 is a diagram illustrating a communication process performed by a vehicle and a parking infrastructure for automated valet parking according to one embodiment of the present disclosure.

FIG. 6 is a diagram illustrating a communication process performed between a parking infrastructure 100 for automated valet parking and a vehicle 200.

In step (1), the vehicle 200 enters a parking lot and stops at a predetermined stop position. This stop position may be an entrance gate of a parking lot. The vehicle 200 reports its arrival to the infrastructure 100. In step (2), the infrastructure 100 measures the dimensions of the vehicle 200 and authenticates the vehicle 200 on the basis of an authentication ID of the vehicle 200. In step (3), the infrastructure 100 transmits an authentication ID submission request to the vehicle 200. In step (4), the vehicle 200 transmits the authentication ID to the infrastructure 100. In step (5), the infrastructure 100 determines whether to allow entry of the vehicle 200 into the parking lot on the basis of the received authentication ID. In step (6), the infrastructure 100 notifies the vehicle whether the vehicle 200 is permitted to enter the parking lot according to the results of the authentication. For example, the infrastructure 100 displays a message indicating approval or disapproval of the entry of the vehicle into the parking lot on a display panel installed around the stop position. The driver drives the vehicle 200 to a drop-off zone when the entry of the vehicle into the parking lot is approved. In step (7), the driver turns off the ignition of the vehicle 200, gets out of the vehicle 200, locks the vehicle doors, and leaves the drop-off zone. In step (8), the authority to drive the vehicle 200 is delegated from the vehicle 200 (or the driver) to the infrastructure 100. In addition, in step (9), the infrastructure 100 notifies the driver that it takes the authority to control the vehicle 200 in the parking lot. Such a notification is sent to a driver's smart device through a mobile communication network.

Figure 7:
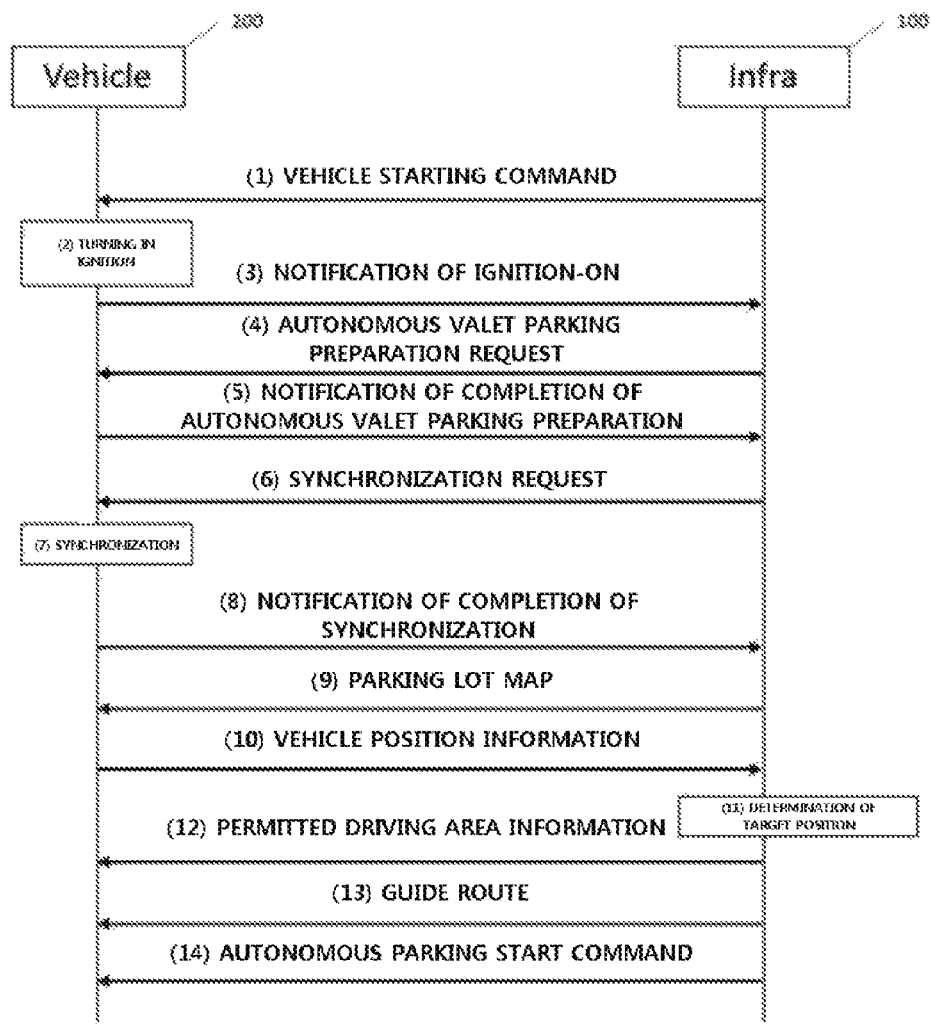
FIG. 7 is a diagram illustrating a communication process performed by a vehicle and a parking infrastructure for automated valet parking according to one embodiment of the present disclosure.

FIG. 7 is a diagram illustrating a communication process performed between a parking infrastructure 100 for automated valet parking and a vehicle 200.

In step (1), the infrastructure 100 transmits an ignition turning-on request to the vehicle 200. In step (2), the vehicle 200 turns on the ignition according to the ignition turning-on request transmitted from the infrastructure 100. In step (3), the vehicle 200 turns on the ignition and then notifies the infrastructure 100 that the ignition is turned on. In step (4), the infrastructure 100 transmits an automated valet parking preparation request to the vehicle 200.

In step (5), the vehicle 200 transmits a reply to the automated valet parking preparation request to the infrastructure 100. The reply is a message of OK indicating that the preparation for automated valet parking is completed or a message of NG indicating that the preparation for automated valet parking is not completed. In step (6), the infrastructure 100 transmits a synchronization request to the vehicle 200. The synchronization request is a request for instructing synchronization of time such that the timer of the infrastructure 100 is synchronized with the timer of the vehicle 200. For example, the synchronization request includes information about time indicated by the timer of the infrastructure 100. In step (7), the vehicle 200 performs the synchronization according to the synchronization request. In step (8), the vehicle 200 transmits a reply indicating that the synchronization is completed to the infrastructure 100. For example, until the synchronization between the infrastructure 100 and the vehicle 200 is completed, a plurality of synchronization requests may be transmitted from the infrastructure 100 to the vehicle 200. In step (9), the infrastructure 100 transmits parking lot map information to the vehicle 200. The parking lot map information includes landmark information. In step (10), the vehicle 200 estimates or calculates the position of the vehicle 200 on the basis of the transmitted landmark information, and the vehicle 200 transmits the estimated position of the vehicle 200 to the infrastructure 100. In step (11), the infrastructure 100 determines a target position (for example, parking place). In step (12), the infrastructure 100 transmits information on a permitted driving area to the vehicle 200. For example, the infrastructure 100 transmits boundary information of the permitted driving area to the vehicle 200. In step (13), the infrastructure 100 transmits a guide route to the vehicle 200. In step (14), the infrastructure 100 transmits an automated valet parking start instruction to the vehicle 200.

Figure 8:
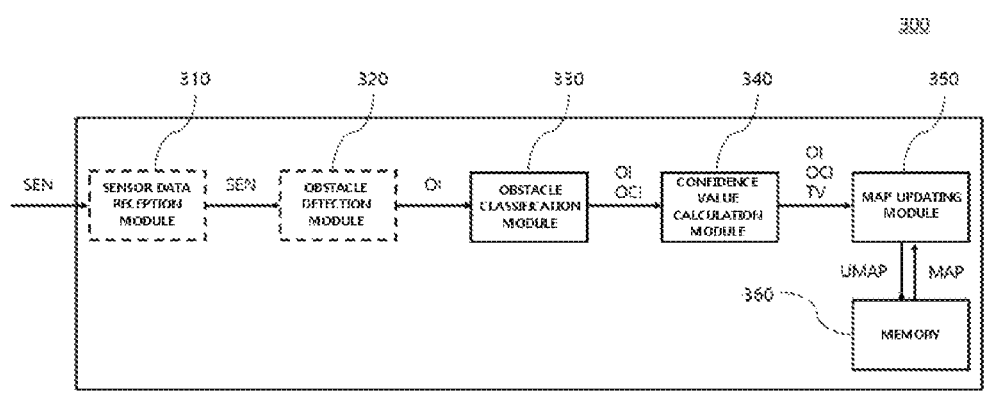
FIG. 8 is a diagram illustrating a map updating device according to embodiments of the present disclosure.

FIG. 8 is a diagram illustrating a map updating device according to one embodiment of the present disclosure. Referring to FIGS. 1 to 8, a map updating device 300 is built in a parking infrastructure 100 or an autonomous valet parking apparatus 50.

The map updating device 300 automatically updates a map used for automated valet parking. According to embodiments, the map updating device 300 detects changes in a map that is stored in the infrastructure 100 or the autonomous valet parking apparatus 50 on the basis of sensor data measured by sensors and updates the map by reflecting the changes on the map.

The map updating device 300 is a device capable of performing computation. That is, the map updating device 300 can perform various computations and can make various determinations required for performing operations and functions that are described in the description of the present disclosure. Examples of the map updating device 300 include a central processing unit (CPU), a micro controller unit (MCU), a microprocessor unit (MPU), a floating point unit (FPU), a digital signal processor (DSP), a programmable logic circuit, a field programmable gate array (FPGA), and a programmable logic array (PLA).

In the description of the present disclosure, the map refers to a map used for automated/autonomous valet parking. According to embodiments, the map includes essentially the geographical map of a parking lot or a parking facility and optionally information required for automated valet parking.

The map may include information on roadsides, lanesides, road markers, etc.

The roadsides include all kinds of structures having a height and a thickness in the parking lot. For example, the roadsides include such as walls, curbs, pillars, guard rails, speed bumps, parking blocks, CCTVs, vents, fluorescent lights, sewer pipes, street lights, sign boards, uphill roads, and downhill roads.

The laneside refers to a solid line or a dotted line marked on the ground and having no height. For example, the laneside refers to a parking line, a lane, a safety area, a stop line, a guide line, a direction line, or the like.

The road marker refers to a diagram or a drawing drawn on the ground and having no height. For example, the road marker refers to an arrow, a disabled parking sign, an exit sign, an entrance sign, a pedestrian crossing, a light car sign, or an eco-friendly car sign.

According to embodiments, the infrastructure 100 determines a target position and a guide route on the basis of the map.

The map updating device 300 includes a sensor data reception module 310, an obstacle detection module 320, an obstacle classification module 330, a confidence value calculation module 340, a map updating module 350, and a memory 360.

Herein, the term "module" refers to a piece of hardware or a piece of hardware provided with a piece of software. That is, a specific module described herein may refer to a device or circuit capable of performing a corresponding function or may refer to a device on which software capable of performing the function runs. In addition, although one or more modules having respective functions are described herein, at least two or more modules may be implemented as one module.

The sensor data reception module 310 receives sensor data SEN from the infrastructure 100 or the autonomous valet parking apparatus 50. According to embodiments, the sensor data reception module 310 receives sensor data SEN from one or more autonomous valet parking apparatuses 200.

The sensor data SEN includes information about the environment around the infrastructure 100 or the autonomous valet parking apparatus 50. For example, the sensor data SEN includes information about objects present around the infrastructure 100 or the autonomous valet parking apparatus 50.

According to embodiments, the sensor data SEN may include information about the surrounding environment measured or detected by the autonomous valet parking apparatus 50 while the autonomous valet parking apparatus 50 performs autonomous valet parking. For example, the sensor data SEN may be measured with at least one type of sensors selected from among an ultrasonic sensor, a RADAR sensor, a LIDAR sensor, a camera, an infrared sensor, a thermal sensor, and a millimeter wave sensor.

The sensor data reception module 310 processes the received sensor data SEN and outputs the processed sensor data. According to embodiments, the sensor data reception module 310 performs pre-processing on the sensor data SEN, such as merging (synthesizing), improving the quality of the sensor data SEN, or compressing. After that, the sensor data reception module 310 outputs the pre-processed sensor data. In some embodiments, the sensor data SEN and the processed sensor data may be the same.

However, since the embodiments of the present disclosure do not vary greatly depending on whether the sensor data SEN is processed or not, only a case where the sensor data reception module 310 outputs the sensor data SEN will be described.

The obstacle detection module 320 receives the sensor data SEN and detects an obstacle on the basis of the sensor data SEN. According to embodiments, the obstacle detection module 320 may compare the sensor data SEN and a map MAP used for automated valet parking and detect an obstacle according to the comparison result.

For example, the obstacle detection module 320 extracts an object from the sensor data SEN and determines whether the extracted object exists in the stored map MAP. When the extracted object is not included in the map MAP, the obstacle detection module 320 detects the extracted object as an obstacle.

The obstacle detection module 320 outputs obstacle information OI according to the results of the obstacle detection. The obstacle information OI includes position information of the detected obstacle (on the map), an image of the detected obstacle, the size of the obstacle, and a detection time when the obstacle is detected. In addition, when the obstacle is measured by a plurality of autonomous valet parking apparatuses, the obstacle information OI includes the number of obstacles detected.

The obstacle classification module 330 classifies the detected obstacles according to a predetermined criterion on the basis of the obstacle information OI. Meanwhile, as indicated with a dotted line in FIG. 3, the map updating device 300 may not include the sensor data reception module 310 and the obstacle detection module 320. In this case, the obstacle classification module 330 receives the obstacle information OI from the outside. For example, the autonomous valet parking apparatus 50 detects an object around the autonomous valet parking apparatus 50 and determines whether the detected object is an obstacle that is not present on the stored map on the basis of the map stored in the autonomous valet parking apparatus 50. The stored map may be a map received from the infrastructure 100. When the object is not present on the stored map, the autonomous valet parking apparatus 50 transmits the obstacle information OI to the infrastructure 100, and the infrastructure 100 updates the map according to the obstacle information OI.

According to embodiments, the obstacle classification module 330 may determine the type of the detected obstacle. For example, the obstacle classification module 330 determines the type of obstacle by extracting feature points from the detected obstacle and comparing the extracted feature points with data in a stored obstacle type database.

The obstacle classification module 330 determines whether the detected obstacle is a permanent obstacle, a semi-permanent obstacle, or a temporary obstacle.

The permanent obstacle refers to an obstacle whose position does not change substantially. For example, the permanent obstacle means an structure additionally installed in a parking facility through construction work. It may be an additional facility, a roadside, a laneside, a road marker, or a building.

The semi-permanent obstacle refers to an obstacle whose position can be changed or which can be eliminated from the current position in a reference time. For example, the semi-permanent obstacle may mean a pylon (lava cone), a sign, a parked car, or a temporarily stopped car. The reference time is preset and stored.

The temporary obstacle means an obstacle whose position changes before the reference time elapses. For example, the temporary obstacle may mean a pedestrian, a moving vehicle, an animal, or an easily movable object.

According to embodiments, the obstacle classification module 330 determines the type of the obstacle by tracking the change in the position of the detected object (or obstacle) and measuring the time required for the change in the position of the object, on the basis of the obstacle information OI. For example, the obstacle classification module 330 determines that the object is a temporary obstacle when the position of the object changes within a first reference time, and determines that the obstacle is a semi-permanent obstacle when the position of the object changes within a time that is longer than the first reference time and shorter than a second reference time. When the position of the object does not change until the second reference time passes, the object is determined as a permanent obstacle. The first reference time may be a shorter time than the second reference time.

The obstacle classification module 330 outputs the obstacle information OI for each obstacle and obstacle type information OCI that is information on the type of each obstacle.

The confidence value calculation module 340 calculates confidence values of the detected obstacles. The confidence value may be a measure to determine whether to reflect the detected obstacle on the map when updating the map.

The confidence value calculation module 340 calculates the confidence value of the detected obstacle on the basis of the obstacle information OI and outputs the confidence value TV according to the calculation result.

For example, the confidence value calculation module 340 calculates the confidence value on the basis of at least one of the number of times the obstacle is detected, the degree of change in the position of the obstacle detected, and the time at which the obstacle is detected. That is, the confidence value calculation module 340 calculates the confidence value on the basis of how long the obstacle is detected, whether the detection position of the obstacle is consistent, or whether the detection frequency of the obstacle is high. The reliability for each obstacle is measured in the form of the reliability value.

In addition, the confidence value calculation module 340 calculates the confidence value of each obstacle by additionally considering the obstacle type information (OCI). According to embodiments, the confidence value calculation module 340 may calculate the confidence value by assigning different weights according to the types of obstacles in the confidence value calculation. For example, the confidence value calculation module 340 may calculate the confidence of the permanent obstacle and the confidence of the semi-permanent obstacle differently although the permanent obstacle and the semi-permanent obstacle are detected for the same time. In this case, the confidence value calculation module 340 determines a higher value as the confidence value of the permanent obstacle. This is because it is desirable for permanent obstacles to be reflected on the map first.

The confidence value calculation module 340 continuously updates the confidence value of each obstacle. For example, the confidence value calculation module 340 may primarily determine the confidence value of a specific obstacle to be a first value and then, when information on the specific obstacle is additionally received, may determine the confidence value to be a second value.

The confidence value calculation module 340 outputs the confidence value TV of the detected obstacle. According to embodiments, the confidence value calculation module 340 outputs the obstacle information OI, the obstacle type information OCI, and the confidence value TV.

The map updating module 350 reflects the detected obstacles on the map on the basis of the confidence values TV. According to embodiments, the map updating module 350 updates the obstacles on the map further on the basis of the obstacle information OI and the obstacle type information OCI.

According to embodiments, the map updating module 350 reads the map MAP stored in the memory 360, and reflects the detected obstacles on the map MAP when the confidence values of the obstacles exceed a reference reliability value. The updated map UMAP is stored in the memory 360.

According to embodiments, when reflecting the obstacles on the map MAP, the map updating module 350 may reflect both the obstacle information OI and the obstacle type information OCI. That is, an updated map UMAP may include obstacle information and obstacle type information on each of the added obstacles to the map.

The memory 360 retains data necessary for the operation of the map updating device 300. According to embodiments, the memory 360 may retain the map MAP and the updated map UMAP. For example, the memory 360 may include at least one of a nonvolatile memory and a volatile memory.

Figure 9:
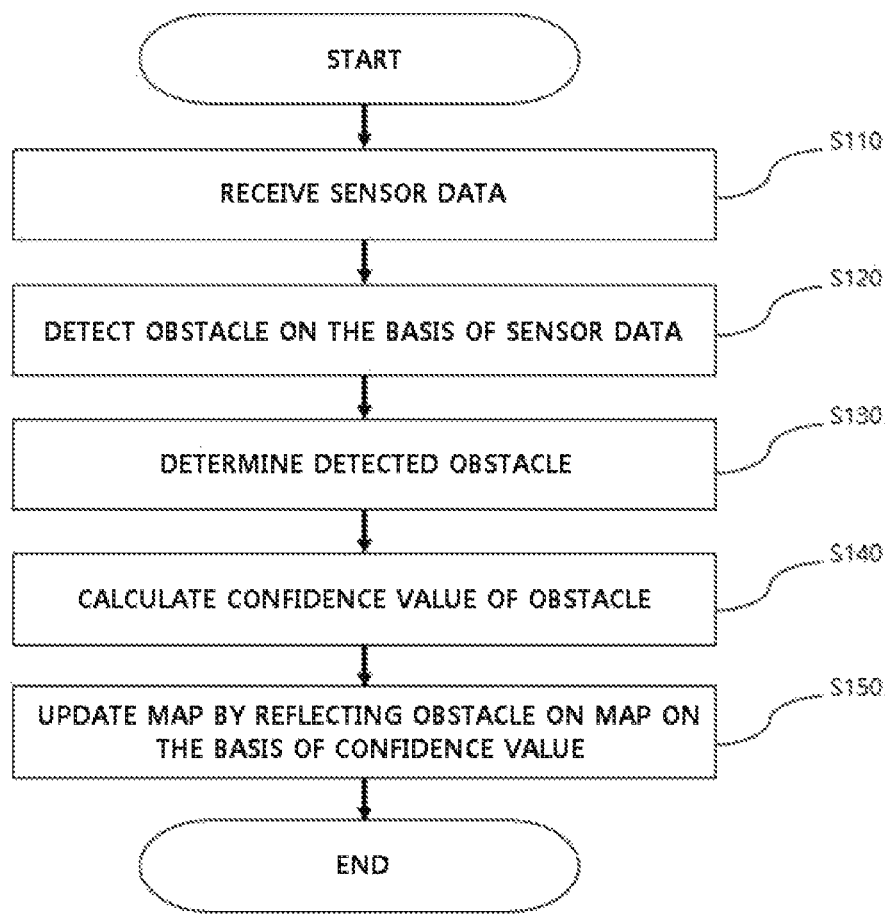
FIG. 9 is a flowchart illustrating a method of updating a map according to embodiments of the present disclosure.

FIG. 9 is a flowchart illustrating a method of updating a map according to embodiments of the present disclosure. Referring to FIGS. 1 to 9, a map updating device 300 receives sensor data SEN in step S110.

The map updating device 300 detects an obstacle on the basis of the sensor data SEN in step S120.

The map updating device 300 determines the type of the detected obstacle in step S130.

The map updating device 300 calculates the reliability of the detected obstacle and generates a confidence value TV of the detected obstacle in step S140.

The map updating device 300 updates a map MAP by reflecting the detected obstacle on the basis of the reliability in step S150. Through the updating of the map MAP, the map updating device 300 generates an updated map UMAP.

Figure 10:
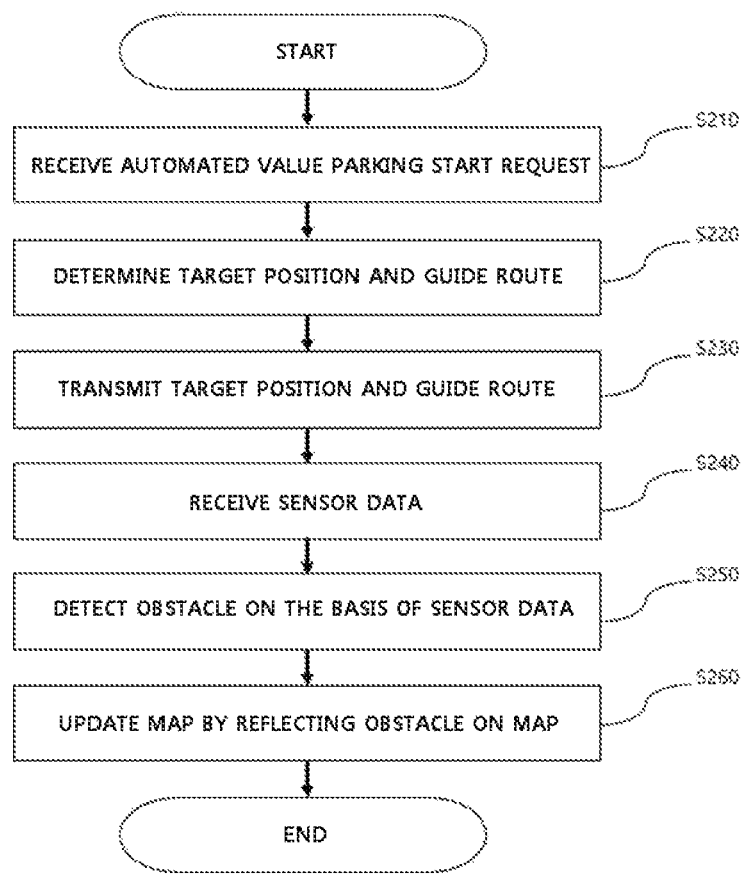
FIG. 10 is a flowchart illustrating a method of operating a parking infrastructure according to embodiments of the present disclosure.

FIG. 10 is a flowchart illustrating a method of operating a parking infrastructure according to embodiments of the present disclosure. The method of operating the infrastructure described with reference to FIG. 10 may be an infrastructure operation method using the map updating device 300 according to embodiments of the present disclosure.

Referring to FIGS. 1 to 10, a parking infrastructure 100 receives a start request for automated valet parking in step S210. According to embodiments, the infrastructure 100 receives a driving authority for an autonomous valet parking apparatus 50 after receiving the start request.

The infrastructure 100 determines a guide route and a target position for the autonomous valet parking apparatus 50 in step S220. According to embodiments, the infrastructure 100 reads a map MAP stored in the infrastructure 100, determines an empty space among the parking spaces in the parking lot as a target position by referring to the map, and determines a guide route that guides the autonomous valet parking apparatus 50 from the current location to the target position.

The infrastructure 100 transmits the target position and the guide route to the autonomous valet parking apparatus 50 in step S230.

The infrastructure 100 receives sensor data SEN in step S240. According to embodiments, the sensor data SEN is generated by the infrastructure 100 or transmitted from the autonomous valet parking vehicle 200.

The infrastructure 100 detects an obstacle in the parking facility on the basis of the sensor data SEN in step S250. The obstacle detection operation of the infrastructure 100 is similar to the obstacle detection operation of the obstacle detection module 320 which has been described above with reference to FIG. 8.

The infrastructure 100 updates the map MAP on the basis of the detected obstacle in step S260. According to embodiments, the infrastructure 100 determines the type of the detected obstacle, calculates the confidence value of the obstacle, and updates the map MAP by reflecting or not reflecting the detected obstacle on the map MAP depending on the calculated confidence value. Through the updating, the infrastructure 100 generates an updated map UMAP.

According to embodiments, the infrastructure 100 determines a target position and a guide route on the basis of the updated map UMAP. For example, when the infrastructure 100 controls an autonomous valet parking operation of each of a first vehicle and a second vehicle, the infrastructure 100 determines a first target position and a first guide route for the first vehicle and transmits the first target position and the first guide route to the first vehicle. Thereafter, the infrastructure updates the map on the basis of the sensor data generated during the autonomous valet parking of the first vehicle. Thereafter, a second target position and a second guide route for the second vehicle are determined on the basis of the updated map. Therefore, when there is a newly detected obstacle during autonomous valet parking of the first vehicle, autonomous valet parking of the second vehicle may be performed in consideration of the newly detected obstacle.

That is, when an updated map is generated after a target position and a guide route are generated, the infrastructure 100 generates a new target position and a new guide route on the basis of the updated map, thereby increasing the accuracy of the autonomous valet parking.

In one or more exemplary embodiments, the described functions may be implemented in the form of hardware, software, firmware, or any combination thereof. When implemented in the form of software, these functions may be stored on or transmitted to a computer-readable medium in the form of one or more instructions or codes. The computer-readable medium refers to any medium that can transfer a computer program from one computer to another. For example, it may be a communication medium or a computer-readable storage medium. The storage medium may be an arbitrary medium that can be accessed by a computer. The computer-readable media include, not limitedly, RAMs, ROMs, EEPROMs, optical discs such as CD-ROM, magnetic disks, and any media that can be accessed by computers and which can be used to transfer a computer program in the form of instructions from one place to another. The computer-readable media are appropriately referred to as media that can be arbitrarily accessed by computers. For example, software can be transferred from a website, server or other remote sources through a cable or over a wireless channel. Examples of the cables include coaxial cable, fiber optic cable, twisted pair cable, and digital subscriber line (DSL). Examples of the wireless channel include infrared frequency waves, radio frequency waves, and ultrahigh frequency waves. In this case, the coaxial cable, the fiber optic cable, the twisted pair cable, the DL, and the wireless channels fall within the definition of the medium. The disks or discs include a compact disc (CD), a laser disc (LD), an optical disc (OD), a digital versatile disc (DVD), a floppy disk (FD), and a Blu-ray disc. Discs generally refer to media from which data is optically read and disks refer to media from which data is magnetically read. Combinations of the above-mentioned media also fall within the definition of the computer-readable medium.

When embodiments are implemented as program code or code segments, the code segment may be a procedure, function, subprogram, program, routine, subroutine, module, software package, class, instructions, data structures, program command strings, or an arbitrary set of program command strings. One code segment may be connected with another code segment or a hardware circuit in a manner of transmitting and receiving information, data, arguments, parameters, or memory content. Information, arguments, parameters, data, and the like may be delivered, sent, or transmitted using any suitable means such as memory sharing, message delivery, token delivery, network transmission, and the like. In addition, in some aspects, steps and/or operations of a method or algorithm may reside on a mechanically readable medium and/or a computer-readable medium in the form of a combination or set of one or more codes and/or one or more instructions that can be integrated into a computer program product.

When implemented as software, the techniques described herein can be implemented as modules (for examples, procedures, functions, etc.) that perform the functions described herein. Software codes may be stored in a memory unit and may be executed by a processor. The memory unit may be embedded in a processor or may be provided outside a processor. In this case, the memory unit may be communicatively connected with the processor by various means known in the art.

When implemented as hardware, processing units may be implemented as one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, electronic devices designed to perform the functions described herein, or any combination of these.

The above-mentioned ones include one or more exemplary embodiments. Of course, the above-described embodiments do not cover all possible combinations of components and/or methods to implement the present invention. Thus, those skilled in the art will appreciate that many further combinations and substitutions of components and/or methods in various embodiments are possible. Accordingly, the above-described embodiments cover all such alterations, modifications, and variations that fall within the spirit and scope of the appended claims. Moreover, as to the scope of the terms "comprises" used in the detailed description or the appended claims, it is noted that it is similarly interpreted as "comprising" that is used as a transitional word in the claims.

As used herein, the term "infer" or "inference" generally refers to a process of determining or inferring a state of a system, environment, and/or user from a set of observations of events and/or data. Inferring can be used to identify a specific situation or action, or can generate a probability distribution of certain states, for example. Inferring is probabilistic. That is, inferring may mean a calculation of a probability distribution of those states, based on study on data and events. Inferring may involve techniques used to construct a higher level event from a set of events and/or data. The inference refers to a process of inferring new events or actions from a set of observed events and/or stored event data, determining whether events are closely correlated in time, and determining whether the events and data come from one or several events and data sources.

Moreover, terms such as "component", "module", and "system" used herein may refer to, not necessarily, computer entities such as hardware, firmware, any combination of hardware and software, software, and a software program being executed. For example, the term "component" may refer to, not necessarily, a process running on a processor, a processor, an object, an executable execution thread, a program, and/or a computer. By way of illustration, both an application running on a computing device and the computing device itself may fall within the definition of the component. One or more components may reside within a process and/or an execution thread. One or more components may be collectively provided in one computer or distributed in two or more computers. In addition, these components can be executed on various computer readable media having various data structures stored thereon. Components can communicate a signal containing one or more data packets (for example, data from an arbitrary component that interacts with a local system, a component of a distributed system, and/or other systems on the basis of a signal that is transmitted over a network such as Internet) with a local and/or remote process.

What is claimed is:

1. An apparatus comprising:
a processor;
a non-transitory memory storing a program to be executed in the processor, the program comprising instructions that when executed cause the processor to:
determine a first target position and a first guide route using a map currently stored;
detect an obstacle on basis of sensor data;
classify the detected obstacle as a permanent obstacle having a fixed position or a temporary obstacle capable of moving,
calculate a confidence value of the detected obstacle based on a weight according to the classification of the detected obstacle and a number of times the obstacle is detected, wherein a weight for the permanent obstacle is higher than a weight for the temporary obstacle; and
determine whether to reflect the obstacle on the map depending on the confidence value and generate an updated map when it is determined that the obstacle should be reflected on the map; and
a transceiver configured to transmit the first target position and the first guide route to a first vehicle under control of the processor, and
wherein the apparatus is configured to perform automated valet parking.

2. The apparatus according to claim 1, wherein the sensor data includes information on an object around the first vehicle and the information on the object around the first vehicle is received from the first vehicle.

3. The apparatus according to claim 2, wherein the instructions cause the processor to determine the object as the obstacle when the sensor data includes information on the object that has not been present on the map.

4. The apparatus according to claim 1, wherein the instructions cause the processor to update the map by reflecting the obstacle on the map when the confidence value exceeds a reference value thereby determining that the obstacle should be reflected on the map.

5. The apparatus according to claim 1, wherein the instructions cause the processor to further calculate the confidence value based on at least one of a degree of change in position at which the obstacle is detected and a detection time at which the obstacle is detected.

6. The apparatus according to claim 1,
wherein the instructions cause the processor to classify the obstacle as the permanent obstacle, a semi-permanent obstacle, or the temporary obstacle, and
wherein, when the permanent obstacle, the semi-permanent obstacle, and the temporary obstacle are detected the same number of times, the confidence value of the permanent obstacle is the highest by the weight according to the classification of the obstacle.

7. The apparatus according to claim 1, wherein the instructions cause the processor to control the transceiver such that an instruction for emergency braking is transmitted to the first vehicle when the obstacle is detected.

8. The apparatus according to claim 7, wherein the instructions cause the processor to control the transceiver such that an instruction for resuming of autonomous valet parking is transmitted to the first vehicle when it is determined that a surrounding environment of the first vehicle enters a safe state after the first vehicle applied an emergency brake.

9. The apparatus according to claim 1,
wherein the instructions cause the processor to determine a second target position and a second guide route on basis of the updated map; and
wherein the transceiver is configured to transmit the second target position and the second guide route to a second vehicle under control of the processor.

10. A method comprising:
determining, by an infrastructure, a first target position and a first guide route using a map stored in the infrastructure;

transmitting, by the infrastructure, the first target position and the first guide route to a first vehicle;

detecting, by the infrastructure, an obstacle on basis of sensor data transmitted from the first vehicle;

determining, by the infrastructure, a second target position and a second guide route on basis of the detected obstacle; and transmitting, by the infrastructure, the second target position and the second guide route to a second vehicle, wherein determining the second target position and the second guide route comprises:

classifying, by the infrastructure, the obstacle as a permanent obstacle having a fixed position, or a temporary obstacle capable of moving;

calculating, by the infrastructure, a confidence value based on a weight according to the classification of the obstacle and a number of times the obstacle is detected; and determining, by the infrastructure, whether to reflect the obstacle on the map depending on the confidence value, and wherein a weight for the permanent obstacle is higher than a weight for the temporary obstacle so that the permanent obstacle is reflected on the map.

11. The method according to claim 10, wherein determining whether to reflect the obstacle on the map depending on the confidence value comprises updating, by the infrastructure, the map by reflecting the obstacle on the map when the confidence value exceed a reference value, and wherein the second target position and the second guide route are determined based on the updated map.

12. The method according to claim 10, wherein calculating the confidence value of the obstacle comprises further calculating the confidence value based on at least one of a degree of change in position at which the obstacle is detected and a detection time at which the obstacle is detected.

13. The method according to claim 10, further comprising instructing the first vehicle to apply an emergency brake in a case where the obstacle is detected.

14. The method according to claim 13, further comprising instructing the first vehicle to resume autonomous valet parking when it is determined that a surrounding environment of the first vehicle enters a safe state after the first vehicle applied the emergency brake.

15. The method according to claim 10, wherein the sensor data includes information on an object that has not been present on the map.

16. A computer-readable non-transitory recording medium storing a program including program instructions for performing an automated valet parking method, the program instructions comprising:

determining, by an infrastructure, a first target position and a first guide route using a map stored in the infrastructure;

transmitting, by the infrastructure, the first target position and the first guide route to a first vehicle;

detecting, by the infrastructure, an obstacle on basis of sensor data transmitted from the first vehicle;

determining, by the infrastructure, a second target position and a second guide route on basis of the detected obstacle; and transmitting, by the infrastructure, the second target position and the second guide route to a second vehicle, wherein determining the second target position and the second guide route comprises:

classifying, by the infrastructure, the obstacle as a permanent obstacle having a fixed position, or a temporary obstacle capable of moving;

calculating, by the infrastructure, a confidence value based on a weight according to the classification of the obstacle and a number of times the obstacle is detected; and determining, by the infrastructure, whether to reflect the obstacle on the map depending on the confidence value, wherein a weight for the permanent obstacle is higher than a weight for the temporary obstacle so that the permanent obstacle is reflected on the map.

17. The computer-readable non-transitory recording medium according to claim 16, wherein determining whether to reflect the obstacle on the map comprises updating, by the infrastructure, the map by reflecting the obstacle on the map when the confidence value exceed a reference value, and wherein the second target position and the second guide route are based on an updated map.

18. The computer-readable non-transitory recording medium according to claim 16, wherein calculating the confidence value of the obstacle comprises calculating the confidence value based on at least one of a degree of change in position at which the obstacle is detected and a detection time at which the obstacle is detected.

19. The computer-readable non-transitory recording medium according to claim 16, wherein the program instructions further comprise instructing the first vehicle to apply an emergency brake when the obstacle is detected.

* * * * *